United States Patent [19]
Feoktistov et al.

[11] 3,896,281
[45] July 22, 1975

[54] MAGNETICALLY ACTUATED LIQUID LEVEL SIGNALLING DEVICE

[76] Inventors: Evgeny Ilich Feoktistov, Prospekt Oktyabrya, 53, kv. 75; Evgeny Arkadievich Chechulin, Aiskaya ulitsa 77/2, kv. 24; Nikolai Semenovich Zonov, ulitsa Parkhomenko, 104, kv. 60; Leonid Kronidovich Prozorov, ulitsa Tsjurupy 84, kv. 239; Jury Maximovich Poskryakov, Revoljutsionnaya ulitsa 82, kv. 5; Grigory Grigorievich Kremennoi, ulitsa Festivalnaya 15, kv. 25, all of Ufa; Vladimir Mikhailovich Goryachy, Komsomolskaya ulitsa 37a, kv. 29, Okha-na-Sakhaline, all of U.S.S.R.

[22] Filed: Nov. 7, 1973

[21] Appl. No.: 413,453

[52] U.S. Cl. ................. 200/84 C; 73/308; 340/244; 200/81.9 M; 335/207
[51] Int. Cl. ...................... H01h 35/18; H01h 36/02
[58] Field of Search .... 200/79, 85 R, 84 C, 81.9 M; 340/244; 335/205, 207; 73/308

[56] References Cited
UNITED STATES PATENTS

| | | | |
|---|---|---|---|
| 2,300,300 | 10/1942 | Lund................................. | 200/84 C |
| 3,293,579 | 12/1966 | Harper............................. | 200/84 C |
| 3,576,413 | 4/1971 | Creager........................... | 200/84 C |
| 3,659,064 | 4/1972 | Inoue............................... | 200/84 C |

Primary Examiner—Gerald P. Tolin
Attorney, Agent, or Firm—Holman & Stern

[57] ABSTRACT

A liquid level signalling device comprising a stationary magnet mounted in a housing of the device, a magnetically driven contact located in the stray field of the stationary magnet, and a movable magnet connected to a float by means of a flexible link, the float cooperating with the liquid being controlled. The stationary magnet is permanently positioned relative to the movable magnet so that the two magnets face each other with opposite poles. The movable magnet is accommodated in the housing at a distance from the stationary magnet which ensures its attraction thereby upon immersing the float into the liquid. The movable magnet compensates for the action of the magnet stray flux upon the magnetically driven contact.

2 Claims, 1 Drawing Figure

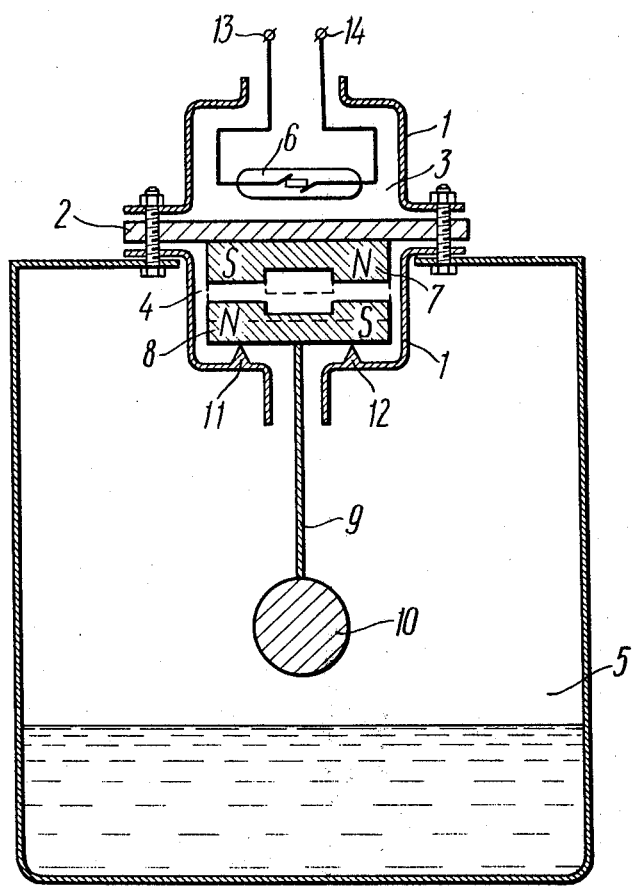

MAGNETICALLY ACTUATED LIQUID LEVEL SIGNALLING DEVICE

BACKGROUND OF THE INVENTION

The invention relates to the manufactures of instruments, and more specifically to a liquid level signalling device for indicating the level of liquid media in various receptacles, production equipment and the like including those operating under a considerable gauge pressure. All types of reservoirs used in the oil industry including those having a floating cover and pontoon roofing can be equipped with such liquid level signalling devices.

The liquid level signalling device of this type may be used for level control in sewage wells, in various water structures, as well as for controlling the level of diverse liquid food products.

A known liquid level signalling device comprises a float, a stationary magnet, a magnetically driven contact located in the stray field of the stationary magnet, and means compensating for the action of the magnet stray flux upon the magnetically driven contact, which compensating means is connected to the float.

In the liquid level signalling device known in the art the means compensating for the action of the magnet stray flux upon the magnetically driven contact comprises a core plunger made of a magnetically permeable metal having one end connected to the float. The other end of the core plunger is movable in a tube formed of a non-magnetic material.

The magnetically driven contact is actuated by partially shunting the stray flux of the stationary magnet with the core plunger of a magnetically permeable metal in the zone of the magnetically driven contact.

The partial shunting of the stray flux cannot ensure reliable actuation of the magnetically driven contact. The stray flux in the zone of the magnetically driven contact varies slowly at a rate of change in the controlled liquid level. This results in slow growth of the force between the electrodes of the magnetically driven contact, in increased contact resistance, rattle and poor contact therebetween.

Considerable difficulties are also encountered in making the float for such known liquid level signalling device to be used in the production equipment operating under a considerable gauge pressure. Normally the float is a hollow formed member and represents a compromise between two contradictory requirements, i.e. the float must exhibit sufficient buoyancy, while having rather large bearing strength.

Furthermore, the known liquid level signalling device having a metallic core plunger rigidly connected to the float cannot be used in pontoon-type reservoirs.

SUMMARY OF THE INVENTION

It is an object of the invention to provide a liquid level signalling device comprising means compensating for the action of the magnetic stray flux upon the magnetically driven contact which ensures a change in the magnetic stray flux at a rate independent of the rate of change of the liquid level being controlled.

This object is accomplished in a liquid level signalling device comprising a float co-operating with the liquid being controlled, a first magnet stationarily fixed to the housing of the device, a magnetically driven contact located in the stray field of the stationary magnet, and compensating means compensating for the action of the magnetic stray flux upon the magnetically driven contact, which compensating means is connected to the float and, according to the invention, comprises a second magnet permanently positioned relative to the first magnet so that the poles of the first magnet face the poles of the second magnet which have opposite magnetic polarity, the second magnet being connected to the float by means of a flexible link and accommodated in the housing of the device so as to be movable toward the first magnet and at a distance therefrom which ensures its attraction by the first magnet upon immersing the float into the liquid being controlled.

It is advantageous that, in order to simplify the manufacture of the float, as well as to enable the use of the liquid level signalling device according to the invention in production equipment operating under a considerable gauge pressure, the float have a volume gravity substantially equal to the specific gravity of the liquid being controlled.

The term "volume gravity" of the float means the ratio between the weight of the float and the volume of liquid expelled upon complete immersion of the float therein.

The advantage of the liquid level signalling device according to the invention is its high reliability due to the fact that the means compensating for the action of the magnetic stray flux upon the magnetically driven contact constructed according to the invention permits instantaneous actuation of the magnetically driven contact independent of the rate of change in the level of the liquid being controlled.

BRIEF DESCRIPTION OF THE DRAWINGS

The invention will now be described with reference to an embodiment thereof illustrated in the accompanying drawing which shows a diagrammatic view of a liquid level signalling device according to the invention.

DETAILED DESCRIPTION OF PREFERRED EMBODIMENTS

As shown in the FIGURE, the liquid level signalling device comprises a housing 1, which is divided by means of a partition wall 2 of a non-magnetic material into a top chamber 3 which communicates with atmosphere, and a bottom chamber 4 which communicates with a reservoir 5 containing the liquid being controlled. A magnetically driven contact 6 is located directly adjacent to the partition 2 in the chamber 3 and has normally open electrodes.

A rectangular shaped stationary magnet 7 is located in the bottom chamber 4 on the partition wall 2, the longitudinal axis of the stationary magnet 7 and the longitudinal axis of the magnetically driven contact 6 being vertically spaced and extending in parallel therebetween.

Another, movable magnet 8 is accommodated in the bottom chamber 4 under the stationary magnet 7 and in parallel therewith, the magnet 8 being positioned so that its poles face the poles of the stationary magnet having opposite magnetic polarity.

The stationary magnet 7 and the movable magnet 8 are of similar shape and size.

The movable magnet 8 is connected to a float 10 by means of a flexible strip 9. The length of the flexible strip 9 may be adjusted depending upon the level of liquid to be controlled in the reservoir 5. The movable magnet 8 is movable toward the magnet 7, and when the level of liquid in the reservoir 5 is below a particular desired level, the movable magnet is held in its lowermost position under the weight of the float 10 to rest upon the position stops 11 and 12.

At the lowermost position of the movable magnet 8 the magnetic field of the stationary magnet 7 is completed through the magnetically driven contact 6, whereby the latter is closed.

The movable magnet 8 is spaced from the stationary magnet 7 a distance such as to enable its attraction by the latter upon immersing the float 10 into the liquid.

Each electrode of the magnetically driven contact 6 is connected by means of conductors to electrical terminals 13 and 14 which couple the signalling device to an external protection (or signalization) circuit (not shown in the drawing).

The liquid level signalling device according to the invention functions as follows.

Let it be assumed that the reservoir 5 is filled with liquid, and the level rises to a predetermined height. As the float 10 is immersed into the liquid, it becomes "lighter" due to the upthrust of the liquid, and the force applied by the float to the movable magnet 8 through the flexible strip 9 diminishes. Traction force directed upwards and developed by the interacting magnetic fields of the magnets 7 and 8 will overcome the weight of the float 10 immersed into the liquid at a particular level in the liquid in the reservoir.

As a result, the movable magnet 8 will instantaneously move into the uppermost position (shown with dotted line in the drawing), entraining therewith the float 10. Thus, the float 10 and the movable magnet 8 move at a rate which does not depend upon the rate of rise of the liquid level in the reservoir 5. As a result of the instantaneous movement of the movable magnet 8, the intensity of the stray magnetic field in the zone of the magnetically driven contact 6 also instantaneously decreases at the moment, when the movable magnet 8 is close to the stationary magnet 7, and the magnetically driven contact 6 is opened. An electric signal indicating the rise of the liquid level in the reservoir 5 is fed to a cable connected to the terminals 13 and 14.

Now let it be assumed that the level of liquid in the reservoir 5 begins to fall. As the level becomes lower, the float 10 becomes "heavier," and the force applied by the float downwards to the movable magnet 8 through the flexible strip 9 will overcome the force of attraction between the magnets 7 and 8 at another predetermined level of the liquid in the reservoir.

Accordingly, the movable magnet 8, upon being pulled away from the stationary magnet 7, will instantaneously move into the lowermost position in which it is supported by the position stops 11 and 12. In this case the instantaneous downward movement of the movable magnet 8 will also result in an instantaneous growth of the stray flux in the zone of the magnetically driven contact 6, and the latter will close.

Therefore, when the liquid level in the reservoir 5 falls below a predetermined level the magnet 8 instantaneously moves independent of the rate of fall of the level of the liquid.

It will be apparent from the above description of operation of the liquid level signalling device of the invention that the magnetic flux changes instantaneously in the zone of the magnetically driven contact 6 upon a change in the liquid level independent of the rate at which the level change. This ensures reliable actuation of the magnetically driven contact 6 with a required contact force. According to the invention the movable magnet 8, which is connected to the float 10 by means of the flexible link, comprises an effective part since it moves under the action of its own magnetic field and of the field of the stationary magnet 7 upon the apparent loss of weight of the float 10 immersed in the liquid, whereby not only does the signalling device have the float supported on the surface, but also the float having a negative buoyancy may be used, that is the float has a volume gravity substantially equal to the specific gravity of the liquid being controlled. The use of a negative buoyancy float permits the employment of the liquid level signalling device in production equipment operating under practically any high gauge pressure.

The use of the flexible link between the movable magnet 8 and the float 10 enables the limit values of the controlled level to be readily adjusted by changing the length of the flexible strip 9. The main parts of the liquid level signalling device according to the invention are highly reliable and can operate at an ambient temperature of from −60°C to +100°C.

All known types of reservoirs, including those having a pontoon and underground reservoirs can be equipped with the liquid level signalling device according to the invention.

What is claimed is:

1. A liquid level signalling device controlling the level of liquid in a reservoir comprising: a housing having an upper and lower part separated by a non-magnetic partition and rigidly attached to said reservoir; a first magnet stationarily fixed in the lower part of said housing; a second magnet accomodated in the lower part of said housing beneath said first magnet and at a predetermined distance therefrom so as to be movable toward and away from said first magnet, said second magnet being movably positioned relative to the first magnet for continuous magnetic attraction therebetween so that the poles of said first magnet face the poles of the second magnet having opposite polarity; a float floatably co-operating with the level of liquid being controlled in the reservoir; a flexible link connecting said second magnet to said float to move therewith and relative to said first magnet according to movements of the level of the liquid in the reservoir; a magnetically driven contact mounted in the upper part of said housing in the stray magnetic flux field of said first magnet, said second magnet compensating for the action of the stray magnetic flux of said first magnet upon said magnetically driven contact whereby when the level of the liquid in the reservoir falls, the second magnet moves away from the first magnet and the stray flux of said first magnet in the vicinity of said contact increases to close said contact, and when the level of the liquid in the reservoir rises the stray flux of said first magnet in the vicinity of said contact decreases to thereby open said magnetically driven contact.

2. A liquid level signalling device as claimed in claim 1, wherein said float has a volume gravity substantially equal to the specific gravity of the liquid being controlled.

* * * * *